March 3, 1953  R. H. BRANDES ET AL  2,630,136
CONTROL VALVE
Filed June 8, 1949  2 SHEETS—SHEET 1
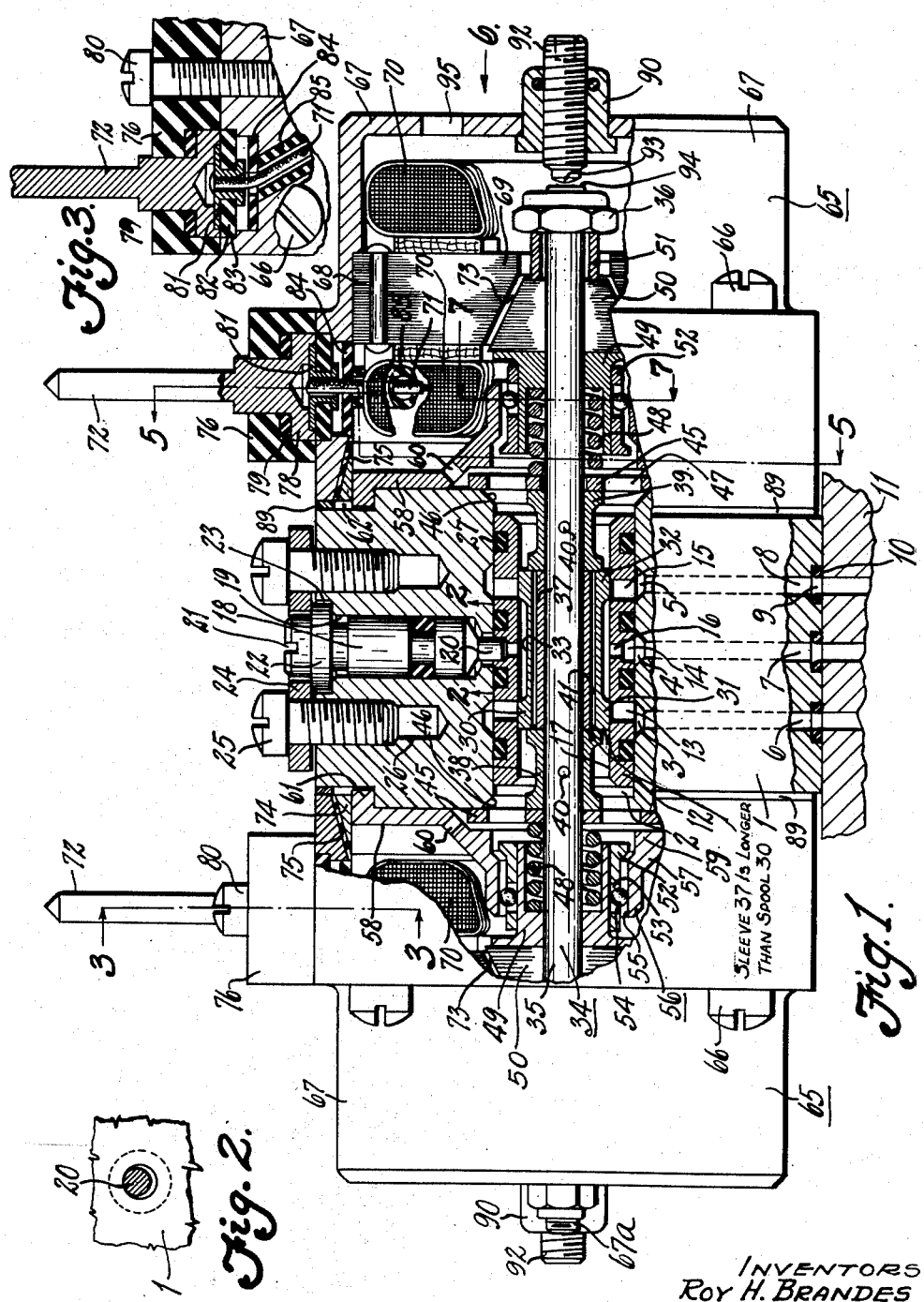
INVENTORS
ROY H. BRANDES
ROBERT C. TRESEDER
By Spencer, Hardman & Fehr
their ATTORNEYS

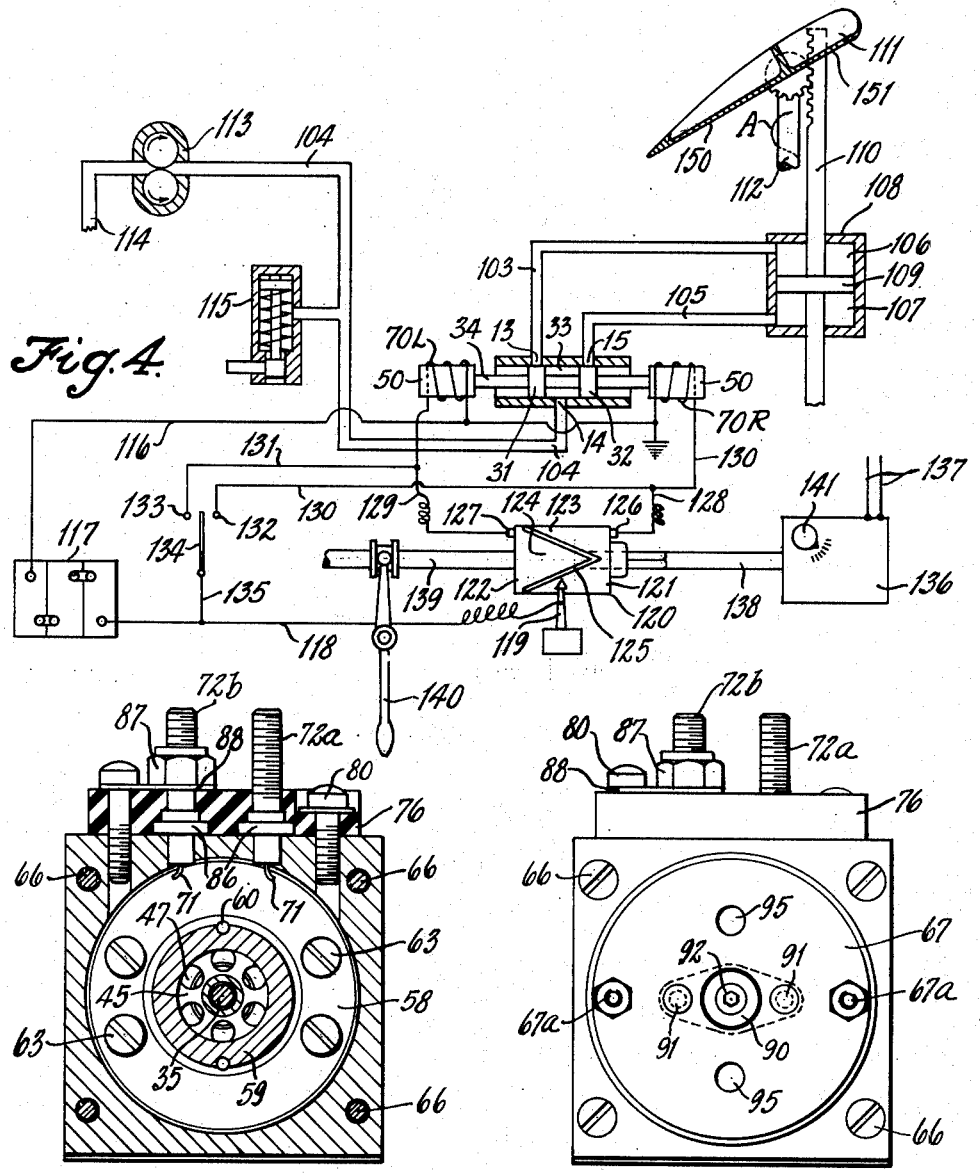
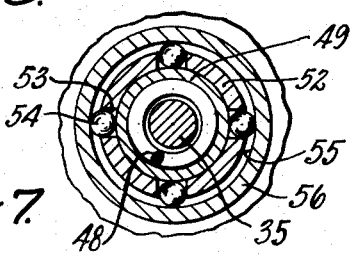

Patented Mar. 3, 1953

2,630,136

UNITED STATES PATENT OFFICE 2,630,136

CONTROL VALVE

Roy H. Brandes and Robert C. Treseder, Dayton, Ohio, assignors to General Motors Corporation, Detroit, Mich., a corporation of Delaware Application June 8, 1949, Serial No. 97,724

18 Claims. (Cl. 137—623)

1

The invention disclosed herein relates to a double-acting reversely movable control valve that is adapted to direct the flow of fluid pressure from a source port to and from either one of a pair of spaced control ports and is adapted to electromagnetic actuation for holding the valve open with respect to one port, or for reciprocatory movement to rapidly and alternately open and close the two control ports at a relatively high frequency, and thus due to the method of actuation, the valve is adapted to establish solid flow of fluid pressure thru one of the control ports with drain from the other control port, or intermittent flow of high frequency in the nature of short pulses first thru one port and then thru the other port. To accomplish these ends, the valve structure embraces an adjustable porting sleeve and a cooperative spool valve for controlling the ports, which spool valve has a floating support on a plunger assembly that is provided with stops and preloaded springs that normally position the spool valve in a mid position bearing a definite relation with respect to the ports in the porting sleeve. Support means for the plunger assembly maintains concentricity of the plunger assembly with respect to the valve body. The plunger assembly carries armatures cooperable with field magnets of the solenoid through a tapered air gap, which field magnets are also piloted or centered with respect to the support assembly. The support assembly for the plunger assembly is such that distribution of the movable valve parts and armatures tend to counteract any bending or flexing of the plunger assembly normal to the spool valve, such that when the control valve is mounted in a rotating structure with its plunger assembly generally at right angles to the action of centrifugal force, that there will be insufficient bending or flexing of the plunger assembly to effect any lateral movement of the spool valve relative to the porting sleeve. Secondary adjustments are provided for reducing the travel of the plunger assemblies when one of the solenoids is actuated and thus limiting the amount of either port opening. Provision is made for using the drain oil from each of the ports to lubricate the moving parts and also to cool the respective magnet assembly by which the plunger assembly is actuated.

It is therefore an object of this invention to provide a control valve that is susceptible of relatively high frequency operation for alternate opening of control ports, and which is adaptable for modulated operation to control the length of port opening such that either pulse like applications of fluid pressure may be applied to both of the control ports, and differentially altered in operation to effect solid flow thru one of the control ports.

Further objects and advantages of the present invention will be apparent from the following description, reference being had to the accompanying drawings wherein a preferred embodiment of the present invention is clearly shown.

In the drawings:

Fig. 1 is an enlarged view partly in longitudinal section and partly in elevation of the invention disclosed herein.

Fig. 2 is a detail of adjustment as indicated by line and arrows 2—2 of Fig. 1.

Fig. 3 is a detail in section of the electric terminal construction as indicated by line and arrows 3—3 of Fig. 1.

Fig. 4 is a schematic circuit diagram illustrating adaptations for the valve subject to the instant invention.

Fig. 5 is a transverse sectional view thru the valve substantially as indicated by the line and arrows 5—5 of Fig. 1.

Fig. 6 is an end elevation of the valve substantially as indicated by the arrow 6 of Fig. 1.

Fig. 7 is a sectional detail of the plunger support substantially as indicated by the line and arrows 7—7 of Fig. 1.

With particular reference to the drawings, 1 indicates a central block and support for the valve assembly, it having a central bore 2 undercut to provide annular grooves 3, 4 and 5 into which drill passages 6, 7 and 8 lead from the bottom surface of the block adapted to be connected by 7 with a source of fluid under pressure and to form control passages 6 and 8 leading to any double acting device to be actuated. Each of the bores 6, 7 and 8 ending with counterbores 9 adapted to receive a seal ring 10 compressible into sealing relation with an apertured plate 11 when the valve body is mounted thereon by hold-down screws not shown.

Fitting within the bore 2 of the central block there is a porting sleeve 12 providing ports 13 and 15 adapted to register with the annular grooves 3 and 5 of the central block, and an exterior annular groove 14 having a series of ports 16 connecting the groove 14 with the bore 17 of the porting sleeve. The annular groove 14 is always in communication with the annular groove 4 so that source pressure thru the passages 7, 4, 15 and 16 may always be present at the central portion of the porting sleeve 12.

The porting sleeve 12 is adjustable longitudinally along the length of the bore 2 of the center block by means of an adjusting pin 18 contained within a bore 19 extending from the top surface thereof and opening by a reduced passage into the bore 2 of the center block. The adjusting pin 18 is provided at the inner end with an eccentrically located camming pin 20 that projects into and closely fits the exterior annular groove 14 of the porting sleeve 12. A screwdriver slot 21 on the outer end makes provision for turning the pin 18, and a flange 22 seated in a counterbore 23 is engaged by a clamp plate 24 to hold the pin 18 in the exact position to which it is adjusted. Hold down screws 25 passing thru the plate 24 and threaded into drillways 26 of the body 1 secure the pin 18 in its adjusted position. When the screws 25 are loosened the pin 18 may be turned and because of the eccentric pin 20 the porting sleeve 12 may be shifted a limited amount along the length of the bore 2 in the center block. A plurality of seal rings 27 are disposed in grooves surrounding the porting sleeve 12 and are positioned on each side of the ports 13, 14 and 15 such as to prevent cross flow and leakage of pressure fluid from one passage to another.

A valve spool 30 is slidable within the bore 17 of the porting sleeve and has lands 31, 32 appropriately positioned at either end of the spool to coact in covering the control ports 13 and 15 when the valve is in the neutral or centered position. Between the lands 31 and 32 there is an annular groove 33 that is always open to source pressure available thru 7, 4, 14 and 16. The valve spool 30 is intentionally of small mass and has a relatively large internal bore thru which a plunger assembly 34 extends for control of reciprocating or longitudinal movement of the valve spool. The plunger assembly is made up of a rod 35 threaded at each end to receive a nut 36, the two nuts operating to maintain the plunger assembly in predetermined relation. Centrally disposed on the rod 35 there is a spacing sleeve 37 disposed between two retaining collars 38 and 39 both of which are pinned in fixed relation upon the rod 35 by pins 40, acting together to hold the spacing sleeve 37 against any longitudinal movement along the shaft 35. The spacing sleeve 37 is considerably less in outside diameter than is the inside diameter of the spool valve 30 and thereby provides an annular space 41 between the member 30 and the spacing sleeve 37 such that the plunger assembly may be eccentrically associated, or even cocked with respect to the true axis of the valve element 30. The adjacent end of the collars 38 and 39 is larger in diameter than is the inside diameter of the valve element 30, and the length of the spacing sleeve 37 is sufficiently greater than the length of the valve element 30 to make it possible for the valve element 30 to shift somewhat transversely of the plunger assembly, and yet be so confined between the collars 38 and 39 that any movement of the plunger assembly will operate to shift the spool valve 30 within the bore of the porting sleeve 12.

Inasmuch as the opposite ends of the plunger assembly are identical in construction, a detailed description of one end of the plunger assembly and the solenoid means by which it is operated is believed to be sufficient. Resting against the end of the collar 39 there is a stop plate 45 that is slidable upon the rod 35 and is of sufficient diameter to engage the end of the center block 1 surrounding the bore 2 as at 46 as a stop. The plate 45 has a plurality of holes 47 permitting passage of fluid therethru. A heavy spring 48 surrounding the rod 35 presses the plate 45 against the end of collar 39 and is enclosed in part by a socketed sleeve 49 and against which a laminated armature 50 is forced by a spacing sleeve 51 under the clamping action of the hereinbefore mentioned nut 36. Surrounding the socketed sleeve 49 and secured thereto by any convenient means there is a flanged sleeve member 52 providing a plurality of lineally extending slots 53 within which are disposed antifriction balls 54 large enough to roll upon the outer surface of the sleeve 49 and to have a rolling engagement within the bore of an axial sleeve 55 of a coned plate 56 somewhat as shown in Fig. 1. The sleeve 55 of the coned plate flares outwardly at 57 joining a flat portion 58 that seats against the end surface of the block 1, and has an overhanging portion 59 that extends over the periphery of stop plate 45 to limit longitudinal movement of the plunger assembly. Fluid passages 60 are provided in the flaring portion such as to provide flow for hydraulic fluid when the associated flow port be opened to drain. The coned plate is piloted on the end of the center block 1 by a peripheral flange 61 that engages in a rabbeted groove 62 of the block so that the sleeve 55 will be concentric with the plunger assembly 34. Screw devices 63, as shown in Fig. 5, secure the coned plate to the end of the center block. The relation and dimension of parts are such that the central block with the plunger assembly forms a compact valve unit in which the porting sleeve can be adjusted for centering or for proportional port opening in connection with a reciprocable plunger assembly. That assembly is firmly and accurately supported for positive and definite movement with respect to the porting sleeve which makes for valve operation to very close specifications and tolerances. The plunger assembly is longitudinally guided thru the agency of antifriction ball bearings supported mainly by the end plates that maintain the parts in predetermined relation thereby eliminating frequent adjustment or faulty operation.

For moving the plunger assembly in either direction along the bore of the porting sleeve, a magnet assembly 65 is disposed as a cap over the periphery of the cone plate 56 where it is held in place by screw devices 66 threaded into corners of the central block 1. The magnet assembly 65 comprises a cup-like member 67 within which is secured, by screw or like devices 67a a field frame 68 having pole pieces 69 supporting magnet windings 70 connected by insulated leads 71 to terminal posts 72. The radially inner end of the pole pieces 69 are beveled in a way to provide a conical air gap 73 cooperating with the conical armature 50. The open end of the cap 67 is taper bored to receive a wedge ring 74 concentric therewith and which is secured thereto by a rubber-like sleeve 75 bonded or vulcanized to both the wedge ring 74 and the rim of the cup.

Figs. 1 and 3 show one modification of a terminal structure for the field coil, in which the terminal post 72 is secured in an insulator 76 by means of a head 78 seating against a compressible seal 79. The block 76 is secured upon the upper face of the cap 67 by means of screw devices 80 which forces the terminal member 72 against an eyelet 81 supported by an insulator 82 recessed in a socket 83 of the cap 67. The lead wire 71 is connected to the eyelet 81 and passes thru insulators 84 and 85 to the field winding 70 providing current connection between the winding 70 and a connector that may be frictionally engaged with the terminal 72. A second and similar terminal leading to the other end of the coil 70 may be grounded upon the frame in any convenient manner. In Fig. 5 a modification of the terminal structure is shown in which terminals 72a and 72b supported by the insulated block 76 are surrounded by nonconducting sleeved washers 86, and which encloses the leads 71. Here the terminal 72a is adapted for threaded engagement with a connector while the terminal 72b receives a nut 87 engaging a connector 88 secured beneath the head of one of the screw devices 80 and thereby forms a ground connection for the coil 70, since the screw device 80 threads into the rim of the cap 67.

Each magnet assembly is a complete subassembly and is adapted to be fitted over the end of the plunger assembly to engage the valve assembly about the end plate 58 as shown in Fig. 1. The resilient bond 75 between the wedge ring and magnet cap is very thin and of insulating properties so that adjustment of the magnetic air-gap 73 can be accomplished by the aid of electrical measuring instruments. The valve support assembly and the plunger assembly are concentrically arranged due to the piloting of the plate 56 upon the block 1, and the preloaded ball bearings 52 to 55. The magnet assembly is concentrically arranged about the end of the plunger assembly due to the piloting of the rim of the cap over the edge of the plate 58. It is desirable that the air gap 73 be at a minimum yet large enough that there will be no contact between the armature 50 and field poles 69 when the plunger assembly moves against the stops in either direction. An electrical measuring instrument of the proper type connected across the central body 1 and the cap 67 will show a current value when the magnet parts are in contact. In assembling the magnetic unit upon the valve assembly, the plunger assembly is forced in one direction sufficiently that the stop plate 45 engages the associated stop abutment 59. While the parts are held in that position the magnet assembly is passed over the plunger assembly and with the wedge ring 74 piloting around the flange 61 of the end plate 58. Shims 89 are disposed in sufficient quantity between the block 1 and the edge of cap 67 such that the armature 50 in the depressed position will not engage the pole piece 69 at any point which is indicated by the absence of any reading on the electrical measuring instrument. When that seating has been accomplished the screw devices 66 are tightened to hold in place. Releasing the depressing force allows the plunger assembly to return to its centered relation, and forcing in the opposite direction followed by similar procedure in mounting the other magnet assembly makes the control valve ready for use when it is mounted upon the support 11 and connected into the electric circuit.

Energization of either magnet coil 70 will then operate to shift the plunger assembly longitudinally of the bore of the porting sleeve, the plunger assembly riding on the ball bearings 54 to the extent defined by the spacing between the edge of the stop plate 45 and the stop abutment 59. In some instances it is desired that the longitudinal movement of the plunger assembly, in other words the amount of port opening of the valve, be less than the amount provided by the stop plate 45 and abutment 59. An auxiliary adjustment is supported by means of a nut 90 mounted in the center of the cap 67 by rivets or the like 91 and which provides a screw or like device 92 whose tip 93 may be moved toward or away from the end 94 of the plunger rod 35 by threading the screw 92 into and out of a nut 90. Thus by threading the screw inward the gap between the stop elements is diminished. With reference to Fig. 1, the spacing of auxiliary stop 93—94 is much less than is the built-in stop 45—59. Yet the spacing is such that upon energization of the right hand magnet coil 70 the plunger assembly 34 will be moved to the right, fluid pressure flowing from the source port 7 to enter the groove 33 between the lands of the sleeve valve and pass out the control port 15. The adjustment of auxiliary stop on the other end of the plunger assembly may be more or less than the aforesaid right-hand auxiliary stop, in which instance movement of the plunger in the other direction would be likewise more or less, effecting a correspondingly different port opening for 13 than for port 15.

Whenever the plunger assembly is moved in either direction sufficient to open one of the control ports 13 or 15 then the other control port 15 or port 13 is opened to drain which flows from the end of the porting sleeve 12 thru the holes 47 in the stop plate and thence thru the holes 60 in the cone plate and thru the ball bearing support for the assembly to the interior of the magnet assembly where the hydraulic fluid surrounds the irregularities of the field frame 68, the field winding 70, as well as flows thru the air gap 73 to exit thru 95 to the exterior of the casing. The exhausted hydraulic fluid thereby flowing through the magnet assembly acts to lubricate the bearing for the plunger assembly, and to cool the windings and other parts of the magnet assembly.

One adaptation of the use of the valve herein disclosed is for control of a rotatable apparatus in which the valve is mounted within a rotating reservoir in such manner that the plunger rod 35 is at right angles to the action of centrifugal force. The speed of rotation is such that centrifugal force tends to bow or bend the plunger rod 35 between the spaced support points which would normally effect binding of a valve element carried thereby in sliding thru a porting sleeve. The tendency toward binding and bending of the valve parts has been substantially eliminated by distributing the mass of the assembly along the length of the rod 35, and by placing the supporting bearings in such position and relation that any tendency of the middle portion of the rod to bend or bow outwardly is counteracted by the mass of the armature 50 on the opposite side of the support bearing, which results in reducing the eccentricity of the rod 35 and sleeve 37 with respect to the valve element 30. The spool valve 30 being of small mass is less effected by the centrifugal force, and due to its floating relation as supported by the plunger assembly, is more easily moved when current is applied to either magnet assembly.

The control valve is susceptible of different types of operation as will be apparent in the consideration of the schematic showing of Fig. 4. The valve assembly may be moved to one port opening and held there as long as desired by a continuous application of current to the respective field winding, or the valve may be reciprocated at a relatively high frequency by alternate application of current pulses to the oppositely disposed winding 70. Assuming that the stops for the plunger assembly are equally spaced from the valve in its centered position then equal alternate electrical pulses applied to the magnet winding 70 will effect equal alternate opening of the valve ports. Each time the magnet windings 70 are energized they act upon the plunger assembly to move the assembly against the respective stop and hold it there until the cessation of current in a respective winding. Specifically, and referring to Fig. 1, energization of the right hand coil 70 pulls the plunger assembly 34 to the right until the stop disc 45 engages the stop abutment 59. Continuation of the current in winding 70 holds the plunger assembly in that position until the current is interrupted. Movement of the plunger assembly toward the right compresses the left hand spring 48 between the socket member 49 and the respective stop plate 45. There will be no change in the flexure of the right hand spring 48. Upon current interruption the compressed left hand spring 48 returns the valve assembly to the centered position or that position in which both stop plates 45 engage the end of the center block 1 at their peripheries which is indicated at 46. Energization of the other or left hand coil 70 moves the plunger assembly toward the left in the same manner. If the two magnet windings 70 are alternately energized then the plunger assembly is reciprocated within the bearings 54 at the frequency of alternate energization of the winding 70, the interium of coil energization allowing for a spool valve 30 and a supporting plunger assembly to return to the centered position. The plunger assembly will always return to the centered position even tho the centering springs 48 are compressed to different degrees which might occur by running one of the nuts 36 on to the rod 35 further than the other one.

In the illustration of Fig. 4 the valve is schematically shown as having the porting sleeve 12 surrounding the plunger assembly 34 and having its ports 13, 14 and 15 connected by passages 103, 104 and 105. Passages 103 and 105 lead from ports 14 and 15 to chambers 106 and 107 of a fluid pressure servo 108 containing a double acting piston 109 fitted with a rod 110 for shifting a variable load device driven by an engine shaft 112 in the direction of arrow A. The passage 104 is a pressure supply passage leading from a fluid pressure pump 113 having an intake 114. The source pressure 104 is protected by a pressure control valve 115 that maintains a pressure potential within the line 104 sufficient to actuate the piston 109 of the servomotor when the valve connects the source port 14 to either of the control ports 13 or 15.

In the illustration of Fig. 4 the magnet windings are designed 70L for the left hand and 70R for the right hand winding and they are joined by a common conductor 116 leading to one pole of a source of current such as a battery 117, the opposite pole of the battery connecting by wire 118 with a brush 119 riding upon a contact drum 120. The drum 120 is covered with two contact elements 121 and 122 each of which have triangular extensions 123 and 124 respectively dovetailing with each other but insulated by a nonconducting separation strip 125. Brushes 126 and 127 rub against contacts 121 and 122 respectively and are connected by leads 128 and 129 with the opposite ends of magnet windings 70R and 70L. Branches 130 and 131 connect leads 128 and 129 with switch terminals 132 and 133 adapted to be engaged by a blade 134 connected by 135 joining the wire 118 from the battery 117. A constant speed source 136 powered by an electric source 137 drives a shaft 138 which rotates the contact drum 120 which is mounted upon the shaft 139 longitudinally shiftable by means of a manual lever 140. The constant speed source 136 is controlled by an adjustable knob 141 which selects its speed at which the drum 120 will be driven.

Due to the organization of parts set out in Fig. 4 the load device 111 may be held at fixed position or it may be adjusted to either increasing load or decreasing load by means of pressure applied to the proper side of the piston 109 of the servo unit 108. For maintaining the position of load device 111, assuming that it requires the same amount of power to shift the device in one direction as the other, the brush 119 will ride upon the middle of the drum 120 such as to rub on equal peripheral portions of the contact lobes 123 and 124. With a drum rotating at constant speed then the electrical energization of either of the windings 70L or 70R will be equal, and the port opening of control ports 13 and 15 will be equal. Because of rotation of the drum 120 the winding 70L and winding 70R will be alternately energized and the valve assembly will be reciprocated for equal periods of time in opposite direction. Also the period of port opening at 13 and 15 will be equal in duration of time which will allow equal pulses of fluid pressure to be applied to opposite sides of the piston 109. Under those conditions there will be no resultant movement of the piston and the load device 111 will be maintained in a set or selected position. If the manual lever 140 is oscillated such as to shift the drum 120 along the shaft 138 then the engagement of the brush 119 upon the successive contact elements 123 and 124 will be unequal. The dwell upon one contact element will be shortened while the dwell upon the adjacent contact element will be lengthened which results in one of the magnet windings 70L or 70R being energized for a longer time than the other. In consequence of this the plunger assembly will be held in one extreme position for a longer period of time than it will be held in the opposite extreme position, and as a consequence, the fluid pulse delivered to one side of the piston will be correspondingly longer in time than is the pulse delivered to the opposite side. There is then a resultant movement of the piston 109 which rotates the load device in a corresponding direction. The manual lever 140 may be shifted so far as to move the contact drum 120 far enough that the brush 119 rides upon the connecting portion of the contacts 123 or 124 which then effects a continuous flow of current to one or the other of the magnet windings 70L or 70R so long as the drum and brush remain in that relation. With a continuous flow of current to either of the windings 70L or 70R the valve assembly will be moved against one of the stops and held there tho the drum continues to rotate thru a number of normal contact engagements. With the valve assembly held in one extreme position there is accomplished solid flow of fluid pressure from the source port 14 to either of the control ports 13 or 15 until the piston 109 moves to its limit of travel. On the other hand the switch blade 134 may be manually moved to engagement with either of the terminals 132 or 133 and thereby effect continued energization of one of the magnet coils 70R or 70L which establishes solid flow to one side of the servomotor 108 in a corresponding manner.

In Fig. 4 the variable load device 111 is disclosed as being a propeller blade so mounted upon the rotatable shaft 112 that its trailing edge portion 150 provides a much larger area than its leading edge portion 151 and is of such character that tho rotating with the shaft 112 there is a tendency for the blade to shift in a clockwise direction which would be towards the low pitch position. In a construction so characterized it would be necessary to maintain a greater shifting force in the chamber 107 at all times of propeller rotation. That would mean that in order to maintain a fixed position of a load device 111 larger pulses of fluid pressure would have to be applied to the chamber 107 than to the chamber 106 in order to hold the piston against movement. The characteristics of the valve disclosed in Figs. 1 to 6 is such that that result may be obtained. The adjustment of the stops are such that the connection of ports 15 with supply port 14 can be maintained for a longer period of time, or for a greater extent of opening than is the time or opening of control port 13 and vice versa. The maximum port opening that can be accomplished is determined by the spacing of the stop plate 45 and the abutment 59. Thus if it is desired that the port 15 be opened wider than the port 13 the auxiliary stop on the left hand end of the valve assembly is run in such as to reduce the maximum stop to a value that will permit the flow thru control port 13 plus the tendency of blade shift toward the low angle position to adjust the balance of the force applied thru control port 15.

While the embodiment of the present invention as herein disclosed, constitutes a preferred form, it is to be understood that other forms might be adopted.

What is claimed is as follows:

1. A control valve adapted to control the reverse movement of a load device actuated by fluid pressure, the combination comprising, a body having a central bore and a porting sleeve therein, a spool valve reversely shiftable along the porting sleeve, means for reversely moving the spool valve to opposite sides of a mid position, opposing spring means for returning the valve to the mid position, means exterior to said body for adjusting the porting sleeve along the bore of the body so that ports in the porting sleeve will be closed when the spool valve is in the mid position, and stops limiting the opening of the valve.

2. A control valve adapted to control the reverse movement of a load device actuated by fluid pressure, the combination comprising, a body having a central bore and a porting sleeve therein, fluid pressure source and control ports and passages provided by the body and sleeve, a hollow spool valve slidable within the porting sleeve and adapted in a mid position to close the control ports, a plunger assembly extending axially through the spool valve for shifting it to positions on opposite sides of the mid position, spring means normally centering the plunger assembly at the mid position, antifriction bearings supporting the plunger assembly for reciprocating motion, and stops limiting the amount of reciprocating motion.

3. In a reversely operating valve having a cylindrical sleeve ported to provide a pressure supply port and a pair of control ports, the combination comprising, a spool valve cooperable with the sleeve and having spaced lands for coincidentally closing the control ports of said sleeve, a plunger assembly extending axially through the spool valve for shifting it to uncover the ports of said sleeve, and means including a second sleeve concentric to said plunger assembly and of greater length than said spool valve providing for relative lateral movement of the plunger assembly relative to the spool valve without causing the spool valve to chafe the porting sleeve.

4. In a reversely operating valve having a cylindrical sleeve ported to provide a pressure supply port and a pair of control ports, the combination comprising, a spool valve having a pair of spaced lands adapted to cover the control ports of said sleeve, a plunger assembly for controlling the movement of the spool valve along the sleeve, mechanical stops for limiting the maximum opening of said control ports, and auxiliary stop means engageable with the plunger assembly for adjusting the limit of the maximum port opening.

5. In a reversely operating valve having a cylindrical sleeve with a bore ported to provide a pressure supply port and a pair of control ports, the combination comprising, a spool valve with a bore and having spaced lands movable along the bore of the sleeve to control fluid flow through the control ports, said spaced lands having a width which is at least equal to said control ports, means for reversely moving the spool valve, including a plunger assembly extending through the bore of the spool valve and having fixed collars at opposite ends of the spool valve, stop discs and means yieldably urging the discs against the collars, spaced stop means disposed on opposite sides of the stop discs to limit the plunger movement and define the maximum port opening, and anti-friction means supporting and piloting the plunger assembly with respect to said porting sleeve.

6. A reversely operable solenoid actuated valve for controlling fluid flow through a pair of control ports, the combination comprising, a support body having a cylinder bore therethrough, a porting sleeve disposed in the bore and having ports adapted to connect a pressure source with control passages provided by the support body, means carried by the said body for centering the porting sleeve along the said bore, a plunger assembly adapted to move along the bore of the porting sleeve and having a landed valve element adapted to control fluid flow through the control ports, stop discs on the plunger assembly adapted to engage the support body around the periphery of said cylindrical bore, a plunger support assembly at each end of the support body for piloting the plunger assembly and including a plate with a sleeved extension, a collar carried by the plunger assembly concentric with the sleeved extension, antifriction balls disposed as a reciprocating bearing between the plunger collar and the sleeved extension, compressible spring means on the plunger assembly disposed between the collar and the stop disc normally pressing each stop disc against the support body around the bore of the support body, said plate of the plunger support assembly having a spaced abutment overhanging the periphery of the stop plate to limit movement of the plunger assembly in one direction with respect to the porting sleeve.

7. A reversely operable valve for controlling fluid flow through either of a pair of spaced control ports, the combination comprising, a support body having a through bore and passages for supply and distribution of fluid pressure opening from said bore, a cylindrical valve element operable in said bore to control the flow through said passages, means centering and supporting said valve element with respect to said body through bore and adapted to shift the valve element in either direction, a magnet assembly secured to each end of the support body for actuating the valve element, and means disposed between the support body and the magnet assembly for adjusting the air-gap of said magnet assembly.

8. In a spool and sleeve type valve adapted for mounting and operation in a rotary structure where a valve actuating plunger is disposed at right angles to the centrifugal field of rotation, the combination comprising, a porting sleeve having ports adapted to be connected for fluid flow, a valving sleeve slidable along the bore of the porting sleeve for controlling the fluid flow, said valving sleeve having a large diameter bore, an actuating rod extending through the bore of said valving sleeve, a spacing sleeve on the rod having a length minutely greater than the length of the valving sleeve and an outside diameter sufficiently less than the bore of the valving sleeve to provide for lateral relative shift, a pair of collars secured to the rod and abutting the ends of the spacing sleeve and for engaging the end of the valving sleeve, means for moving the rod to actuate the valving sleeve while the valve and support are rotating, and bearing means for each end of the rod for guiding the rod movement whereby any deflection of the rod due to action of centrifugal force is not transmitted to the valving sleeve.

9. A double acting valve adapted to be mounted on a rotating device for controlling the flow of fluid pressure to a plurality of control ports while the device and valve are rotating, the combination comprising, a central block providing fluid passages to be controlled, and having a bore adapted to enclose a control valve mechanism, a movable valve member adapted to control said fluid passages, a rod assembly for moving said valve element, armatures mounted on opposite ends of said rod assembly, means for piloting the rod assembly in concentric relation to the bore of said central block, magnet means for actuating the armature in either direction, stops provided by the rod assembly and central block preventing engagement of the armature and magnet means, and means independent of said stops for adjusting the air gap to an amount greater than the minimum provided by the said stops.

10. The combination set forth in claim 9, wherein the magnet means has a field frame with poles that pilots over the rod assembly for the valve and provides a conical air gap between the armature and field poles, and shims disposed between the central block and the magnet assembly to prevent the engagement of armature and field frame.

11. In an electromagnetic control valve, the combination comprising, a valve body providing a cylindrical bore and having pressure supply and control ports opening therefrom, a valve spool movable along the bore to control fluid flow and drain through the ports of said body, actuating means for the valve spool including an armature pole piece and magnet coil, bearing means supporting the armature and maintaining concentricity with the bore of said body, and means whereby movement of the valve spool to a port drain position exhausts the draining fluid through the bearing and magnet coil to cool the same.

12. In a solenoid actuated control valve adapted to effect the application and drain of fluid under pressure to and from either of two ports, the combination, comprising, a body providing supply and control ports to be controlled, a pilot valve assembly having a valve spool for controlling the fluid flow to either of the control ports, a laminated armature secured to opposite ends of the pilot valve assembly for reversely shifting the pilot valve to an extreme position on either side of mid position, preloaded spring means biasing the pilot valve assembly to the mid position, a magnet assembly including pole pieces and field coils surrounding opposite ends of the pilot valve assembly for energizing the armatures when movement of the pilot valve is desired, and means including the exhaust of fluid medium drained from either of the control ports for cooling the said field coils.

13. The combination set forth in claim 12, wherein antifriction ball bearing means support the pilot valve assembly for lineal movement, and stops are provided limiting the maximum amount of lineal shift of the pilot valve assembly.

14. In a double acting solenoid actuated control valve, a sleeve providing fluid pressure supply and control ports, a cooperable valve member adapted to stop all flow through the sleeve or direct flow through one or the other of the control ports, an actuator assembly for moving the valve member in either direction, said actuator assembly being provided with stop discs and preloaded springs for centering the valve member in port closing position, ball bearing means supporting the actuator assembly substantially concentric with said sleeve, and electromagnet means for actuating the actuator assembly, said stop discs and bearing means providing openings for the drain of exhausted fluid pressure through the bearing means and electromagnet means for lubrication and cooling of the same.

15. In a control valve adapted to control the reverse movement of a load device actuated by fluid pressure, the combination including, a body having a central bore and a cylindrical porting sleeve therein, said sleeve having openings to provide for a pressure supply port and control ports, a spool valve reversely shiftable along the supporting sleeve and having spaced lands of greater width than said control ports, means for reversely moving the spool valve to opposite sides of a mid position, opposing spring means for returning said valve to the mid position, and means exterior of said body for adjusting the porting sleeve along the bore of the body for differentially varying the respective openings of said control ports.

16. In a reversely operating valve having a cylindrical sleeve ported to provide a pressure supply port and a pair of control ports, the combination including, a spool valve having a pair of spaced lands of greater width than said control ports, a plunger assembly for controlling the movement of said valve along said sleeve, means normally determining the maximum opening of said control ports and auxiliary adjustable means engageable with said plunger assembly for varying the respective openings of said control ports.

17. A reversely operable valve for controlling fluid flow through either of a pair of spaced control ports including, a support body having a through bore and passages for supply and distribution of fluid pressure from said bore, a cylindrical valve element operable in said bore to control the flow through said passages, means centering and supporting said valve element with respect to said body through bore and adapted to move the valve element in opposite directions, a magnet assembly secured to each end of the support body for actuating said means, independently adjustable members disposed at opposite ends of said means for varying the amount of movement of said valve element in opposite directions, and means disposed between the support body and magnet assembly for adjusting the air gap of said magnet assembly.

18. A control valve adapted to control the reverse movement of a load device actuated by fluid pressure including, a support body having a through bore and a cylindrical sleeve, fluid pressure source and control ports and passages provided by the body and sleeve, a cylindrical valve element operable in said bore to control the flow through said ports, means centering and supporting said valve element with respect to said body through bore and adapted to move the valve element in opposite direction, a magnet assembly secured to each end of the support body for actuating the valve element, means for adjusting the cylindrical sleeve along the bore of the body, means for varying the amount of movement of said valve element in opposite directions, and means for adjusting the air gaps of said magnet assemblies so that different openings of said control ports are effected upon movement of said valve element in opposite directions.

ROY H. BRANDES.
ROBERT C. TRESEDER.

REFERENCES CITED

The following references are of record in the file of this patent:

UNITED STATES PATENTS

| Number | Name | Date |
| --- | --- | --- |
| 825,588 | Demarest | July 10, 1906 |
| 972,430 | Beggs | Oct. 11, 1910 |
| 1,028,657 | Aubert | June 4, 1912 |
| 1,166,210 | Holley | Dec. 28, 1915 |
| 2,145,977 | Foster | Feb. 7, 1939 |
| 2,194,782 | Baade | Mar. 26, 1940 |
| 2,307,585 | Harrington | Jan. 5, 1943 |
| 2,396,643 | Ganahl | Mar. 19, 1946 |
| 2,404,349 | Brant | July 23, 1946 |
| 2,407,184 | Sparrow | Sept. 3, 1946 |
| 2,410,404 | Buchanan | Nov. 5, 1946 |
| 2,412,549 | Yates | Dec. 10, 1946 |

FOREIGN PATENTS

| Number | Country | Date |
| --- | --- | --- |
| 503,347 | Great Britain | Apr. 5, 1939 |